Nov. 3, 1970  M. BRISKI  3,537,262
TRANSMISSION MECHANISM
Filed Feb. 26, 1969
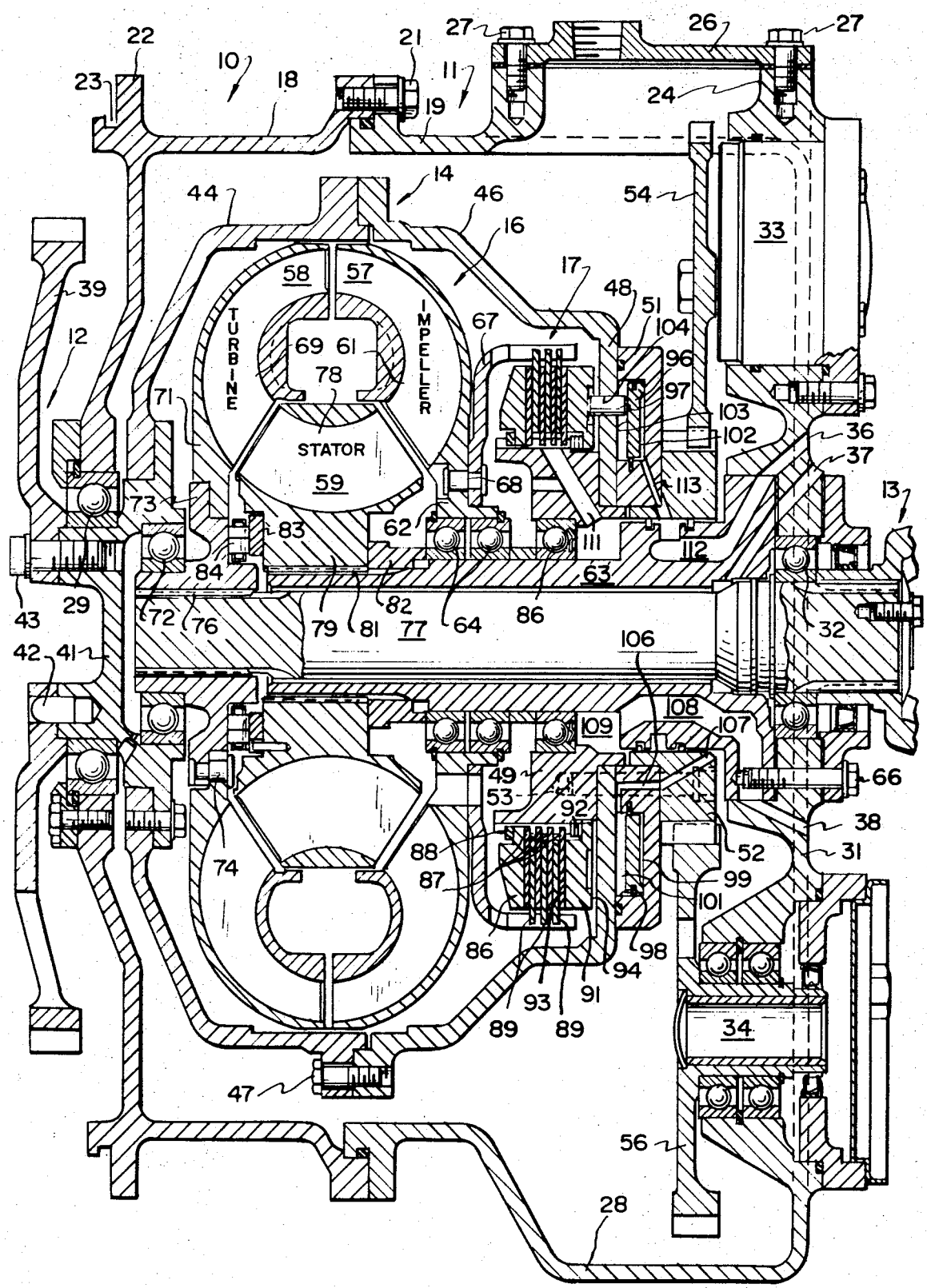
INVENTOR
MICHAEL BRISKI
BY *Herman E. Smith* ATTORNEY United States Patent Office 3,537,262
Patented Nov. 3, 1970

3,537,262
TRANSMISSION MECHANISM
Michael Briski, Rockford, Ill., assignor to Borg-Warner Corporation, Chicago, Ill., a corporation of Delaware
Filed Feb. 26, 1969, Ser. No. 802,530
Int. Cl. F16d 33/00
U.S. Cl. 60—54                                     4 Claims

ABSTRACT OF THE DISCLOSURE

A transmission mechanism includes a torque converter having an impeller which is selectively connectable to an input driving member by means of an hydraulically actuatable clutch, the clutch actuating means including a fluid impedance chamber for regulating the rate of engagement of the clutch.

SUMMARY OF THE INVENTION

The present invention relates generally to a transmission mechanism and more particularly to an hydraulically actuatable clutch therefor.

Heavy duty torque converters of the type described herein include a rotatable fluid housing enclosing the converter elements, the housing being relatively massive in comparison with the converter elements. Accordingly, it is desirable to provide a clutch between the converter elements and the housing for isolating the inertia of the housing from the converter when making changes in the connected torque imposed on the transmission such as when changing gears of an associated mechanical gear train.

A problem encountered in prior devices of this type is concerned with the variation in pressure of fluid within the housing and its affect on operation of such a clutch, such pressure variations resulting in non-uniform engagement and release of the clutch.

A principal object of the present invention is to provide a selectively engageable "wet" type friction clutch between a converter element and the housing, the movable elements of the clutch being balanced with respect to pressure within the housing. A further object is to provide hydraulic engaging means for such a clutch having a regulated rate of engagement.

BRIEF DESCRIPTION OF THE DRAWING

The drawing is a section view taken through a transmission mechanism according to the present invention.

DESCRIPTION OF THE PREFERRED EMBODIMENT

Referring now in more detail to the drawing, the reference character 10 indicates a transmission mechanism according to the present invention. The principle components of transmission 10 include a nonrotatable housing 11, a rotatable driving source 12, an output drive 13, a rotatable housing 14, a hydrokinetic torque converter device 16, and a hydraulically actuatable clutch 17. These principle components together with related elements of the transmission are described in greater detail hereinafter.

Nonrotatable housing 11 includes a front portion 18 and a rear portion 19 secured to each other by means of cap screws such as 21. Housing front portion 18 includes a flange 22 incorporating a seal groove 23 facilitating mounting of the transmission in a vehicle. A bearing 29 is mounted in front portion 18 and supports the rotary driving source 12. Housing rear portion 19 includes an inspection opening 24 and cover plate 26 secured thereto by cap screws 27. A bottom portion 28 of rear portion 19 defines a fluid sump. The rear wall 31 of rear housing portion 19 provides a mounting for bearing 32 which supports output drive 13. Rear wall 31 also supports a pump 33 and auxiliary power take off 34. A fluid apply port 36, a coolant outlet port 37 and a coolant inlet port 38 are located in rear wall 31. A ground sleeve 63 is nonrotatably secured to rear wall 31 by cap screws such as 66.

Rotary driving source 12 includes a spur gear 39 drivingly connected to an adapter 41 by drive pin 42 and cap screws 43. Adapter 41 is secured to a front shell 44 of rotatable housing 14. A rear shell 46 is secured to front shell 44 by cap screws 47 providing a fluid enclosure surrounding the torque converter 16 and clutch 17. A rear wall 48 of rear shell 46 is connected to an input hub 49 of clutch 17, to an annular hydraulic cylinder 51, and to the auxiliary spur gear 52 by means of cap screws such as 53. Auxiliary spur gear 52 is meshed with both a spur gear 54 connected to pump 33, and a spur gear 56 forming a part of power take off 34, thus providing a direct drive connection from driving source 12 to the pump and power take off through housing 14.

Rear shell 46 of rotatable housing 14 is rotatably supported on ground sleeve 63 by means of bearing 86 and clutch input hub 49. Hydrokinetic torque converter 16 includes an impeller 57, a turbine 58, and a stator 59 arranged in toroidal fluid flow relationship. Impeller 57 includes a bladed portion 61 defining a portion of a toroidal chamber and a hub portion 62 rotatably mounted on ground sleeve 63 by means of bearings 64. Impeller hub portion 62 is connected to clutch driven member 67 by rivets such as 68. Turbine 58 includes a bladed portion 69 defining a portion of the toroidal chamber and a hub portion 71, secured to adapter 73 by means of rivets 74. Adapter 73 provides for rotatably mounting turbine 58 in housing 14 by means of bearing 72. Adapter 73 also includes a spline connection 76 with shaft 77 of output drive 13. Stator 59 includes a bladed portion 78 defining a portion of the toroidal chamber and a hub portion 79 having a spline connection 81 with ground sleeve 63. Stator 59 is axially positioned with respect to the turbine and impeller by means of spacers 82, 83 and thrust bearing 84.

Disconnect clutch 17 includes input hub 49 connected to rotary housing 14, and driven portion 67 connected to impeller 57. A backing plate 86 and a first group of clutch discs 87 are spline connected to input hub 49, backing plate 86 being retained against axial movement by retainer ring 88. A cooperating group of clutch discs 89 is spline connected to clutch driven portion 67. The discs 87 and 89 provide selectively engageable friction means for establishing a driven connection between rotary housing 14 and impeller 57. An engaging element 91 in the form of an annular pressure plate is mounted for axial movement in one direction for clamping friction means 87, 89 together to provide a driving connection between housing 14 and impeller 57 and is biased for movement in the opposite direction by means of spring 92 for releasing or disengaging the driving connection. Engaging element 91 has opposite faces 93, 94 exposed to fluid in housing 14 in order to maintain a balance of fluid pressures acting on the element from within the housing 14. Thus changes in fluid pressure within housing 14 have no effect on the speed of engagement or release of clutch 17.

Actuating means for clutch 17 includes annular hydraulic cylinder 51, piston 96 and plunger 97. The hydraulic cylinder 51 includes a piston chamber 98 which is divided into an apply chamber 99 and an impedance chamber 101 on opposite faces of piston 96. One face 102 of piston 96 is exposed to fluid in apply chamber 99 while the opposite face 103 is exposed to fluid in impedance chamber 101. Plunger 97 extends through an access aperture 104 in rear wall 48 between engaging element 91 and piston 96. Engaging element 91, plunger 97 and piston 96 move together in one direction for engaging the clutch in response to fluid pressure increase in apply chamber 99 and move together in the opposite direction for releasing the clutch as a result of the bias of spring 92 when the pressure of fluid in apply chamber 99 is reduced to a predetermined level.

Access aperture 104 and plunger 97 are sized to provide a predetermined clearance space around the plunger, the clearance space defining a metering orifice for conducting fluid from housing 14 to impedance chamber 101. The spur gear 52 and annular member 51 are drilled to provide the passage 106 defining a constricted exhaust port from impedance chamber 101. In the preferred form of the invention passage 106 is arranged and disposed such that its outlet 107 is as near as practical to the axis of rotation of housing 14. The inlet port defined by access aperture 104 and plunger 97 provide a source of fluid for impedance chamber 101 while passage 106 and outlet 107 provide means for maintaining a predetermined charge of fluid in the impedance chamber.

The structure and operation of clutch 17 can be more fully appreciated when considered in relation to other members of the transmission. In operation, fluid is supplied to the interior of housing 14 by means of inlet port 38, and the passages 108, 109, 111, in addition passage 111 supplies fluid to the friction means 87, 89 of clutch 17. The fluid thus supplied fills the toroidal chamber defined by the bladed portions of the impeller, turbine and stator and is exhausted between shaft 77 and ground sleeve 63 to and through outlet port 37. A portion of the fluid supplied to housing 14 is metered around plunger 97 into impedance chamber 101. Driving torque supplied to rotary power source 12 results in the rotation of housing 14, the input hub 49 of clutch 17, pump 33 and power take off 34. When it is desired to couple output drive 13 to input drive 12, apply fluid is directed from an external source through apply port 36 and passages 112, 113 to apply chamber 99. The introduction of apply fluid to apply chamber 99 imposes a fluid pressure on face 102 of piston 96 moving it in a direction to engage clutch 17. The presence of fluid in impedance chamber 101 imposes a resistance on the opposite face 103 of piston 96 thereby regulating the speed of movement of the piston in the engaging direction in accordance with the size of exhaust passage 106 and port 107. The friction means 87, 89 and engaging element 91 being surrounded by fluid within housing 14, offer no hydraulic resistance to the movement of piston 96, thereby affording smooth engagement of clutch 17 for bringing the impeller up to the speed of housing 14. Torque converter 16 then functions in a well known manner to supply power to output shaft 77.

When it is desired to break the power connection to output shaft 77, apply fluid is diverted from apply chamber 99 allowing spring 92 to move engaging elements 91 and piston 96 in a direction away from clamping engagement with friction means 87, 89. Such movement results in drawing fluid from housing 14 through aperture 104 for recharging impedance chamber 101, thereby again conditioning clutch 17 for regulated reengagement.

While a preferred embodiment of the invention has been shown and described in the foregoing description and drawing, it is to be understood that various modifications and alternate forms thereof exist within the spirit of the invention and scope of the following claims.

What is claimed:

1. A transmission mechanism comprising: a rotatable housing defining a fluid enclosure drivingly connected to a rotatable driving source; a hydrokinetic device disposed within said housing including a rotatable fluid impeller; an hydraulically actuatable clutch operatively connecting said rotatable housing with said impeller providing a selectively engageable driving connection therebetween; and actuating means for engaging said clutch including a movable piston member operatively coupled to said clutch, said piston member having one face thereof exposed to a source of apply fluid effective to urge said piston in one direction for engaging said clutch, and having an opposite face thereof exposed to fluid in an impedance chamber for retarding movement of said piston in said one direction, said impedance chamber including a constricted exhaust port for regulating the velocity of movement of said piston in said one direction.

2. A transmission mechanism according to claim 1 wherein said clutch is disposed within said rotatable housing and includes a movable engaging element operatively coupled with said actuating means, said engaging element having a pair of opposite faces exposed to fluid within said housing for maintaining said engaging element substantially balanced with respect to fluid pressure within said housing.

3. A transmission mechanism according to claim 1 wherein said impedance chamber includes an inlet port communicating with said housing effective to recharge said impedance chamber with fluid from said housing in response to disengagement of said clutch.

4. A transmission mechanism according to claim 1 wherein said housing includes a piston chamber and an access aperture communicating said fluid enclosure with said piston chamber, said piston being disposed for reciprocating movement within said piston chamber and defining therein an apply chamber adjacent one face of said piston and an impedance chamber adjacent said fluid enclosure, said clutch including friction means and an engaging element disposed within said fluid enclosure, said engaging element being movable toward clamping engagement with said friction means for engaging said clutch in response to movement of said piston in said one direction, and being resiliently biased for movement in the opposite direction for releasing said clutch, said actuating means including a plunger extending through said access aperture between said engaging element and said piston and defining with said aperture a metering orifice for recharging said impedance chamber with fluid from said fluid enclosure in response to release of said clutch.

References Cited

UNITED STATES PATENTS

| 2,190,830 | 2/1940 | Dodge. |
| 2,548,272 | 4/1951 | Seybold. |
| 2,719,440 | 10/1955 | Banker. |
| 2,782,658 | 2/1957 | Schaefer et al. |
| 3,147,595 | 8/1964 | Liang. |
| 3,238,726 | 3/1966 | Jandasek. |
| 3,263,522 | 8/1966 | General. |

EDGAR W. GEOGHEGAN, Primary Examiner